US012496887B2

(12) United States Patent
Han (10) Patent No.: US 12,496,887 B2
(45) Date of Patent: Dec. 16, 2025

(54) VEHICLE LOWER STRUCTURE FOR MOUNTING BATTERY (71) Applicants: Hyundai Motor Company, Seoul (KR); Kia Corporation, Seoul (KR)

(72) Inventor: Yong Soo Han, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 402 days.

(21) Appl. No.: 18/084,793

(22) Filed: Dec. 20, 2022

(65) Prior Publication Data

US 2023/0278412 A1    Sep. 7, 2023

(30) Foreign Application Priority Data

Mar. 7, 2022 (KR) .................. 10-2022-0028588

(51) Int. Cl.
*B60K 1/04* (2019.01)
*B62D 25/20* (2006.01)

(52) U.S. Cl.
CPC ................ *B60K 1/04* (2013.01); *B62D 25/20* (2013.01); *B60K 2001/0438* (2013.01)

(58) Field of Classification Search
CPC ............. B60K 1/04; B60K 2001/0438; H01M 50/264; B62D 25/20; B62D 27/02; B62E 21/15
See application file for complete search history.

(56) References Cited

U.S. PATENT DOCUMENTS

| | | | |
|---|---|---|---|
| RE44,994 E | 7/2014 | Rawlinson et al. | |
| 10,994,788 B2 | 5/2021 | Otoguro et al. | |
| 2017/0305249 A1* | 10/2017 | Hara ................. | B62D 25/2036 |

FOREIGN PATENT DOCUMENTS

| | | |
|---|---|---|
| CN | 201347134 | 11/2009 |
| JP | H09-175443 | 7/1997 |
| JP | 4494333 | 6/2010 |
| JP | 2017-193288 | 10/2017 |
| JP | 6610576 | 11/2019 |
| JP | 6791037 | 11/2020 |
| KR | 101896704 | 9/2018 |
| KR | 1020200104625 | 9/2020 |
| KR | 1020210104187 | 8/2021 |

* cited by examiner

Primary Examiner — Jason D Shanske
Assistant Examiner — James J Triggs
(74) Attorney, Agent, or Firm — Fish & Richardson P.C.

(57) ABSTRACT

A vehicle lower structure for mounting a battery includes a floor panel, a first transverse cross member mounted on the floor panel, a first longitudinal cross member mounted on the floor panel and having one end overlapped with and coupled to the first transverse cross member, and a first battery mounting part coupled to a first overlapping portion in which the first transverse cross member and the first longitudinal cross member overlap.

20 Claims, 4 Drawing Sheets

VEHICLE LOWER STRUCTURE FOR MOUNTING BATTERY

CROSS-REFERENCE TO RELATED APPLICATION

This application claims under 35 U.S.C. § 119(a) the benefit of priority to Korean Patent Application No. 10-2022-0028588 filed on Mar. 7, 2022, the entire contents of which are incorporated herein by reference.

TECHNICAL FIELD

The present disclosure relates to a vehicle lower structure for mounting a battery, and more specifically, to a vehicle lower structure capable of securing the robustness of a battery mounting structure for a vehicle body.

BACKGROUND

In general, electric vehicles use a battery as a power source, and the battery is mounted under the vehicle. The battery is typically mounted on a body floor and disposed under the body floor. The body floor is configured to include a floor panel and a transverse cross member and a longitudinal cross member mounted on the floor panel.

In some cases, loads in various directions are applied to the vehicle according to the traveling environment, and both transverse loads and longitudinal loads are applied when a collision occurs.

However, in the related art, since a mounting part (i.e., the battery mounting part) of the battery is fastened to only any one of the transverse cross member and the longitudinal cross member of the body floor, there occurs a problem in that the battery is vulnerable to the load in any one direction when the transverse load and the longitudinal load are transmitted to the battery, so that there is a problem in that it is difficult to secure the durability performance and collision performance of a coupled portion between the battery and the body.

The above information disclosed in this Background section is only for enhancement of understanding of the background of the disclosure and accordingly it may include information that does not form the prior art that is already known in this country to a person of ordinary skill in the art.

SUMMARY

The present disclosure has been made in efforts to solve the above problem, and an object of the present disclosure is to provide a vehicle lower structure for mounting a battery, which may be configured to distribute loads applied to a body through a battery, thereby securing the robustness and durability of a coupled portion between the battery and the body.

The objects of the present disclosure are not limited to the above-described object, and other objects of the present disclosure not mentioned will be clearly understood by those skilled in the art to which the present disclosure pertains from the following description.

According to one aspect of the subject matter described in this application, a vehicle lower structure for mounting a battery includes a floor panel, a first transverse cross member mounted on the floor panel, a first longitudinal cross member mounted on the floor panel and having one end overlapped with and coupled to the first transverse cross member; and a first battery mounting part coupled to a first overlapping portion in which the first transverse cross member and the first longitudinal cross member overlap.

Implementations according to this aspect can include one or more of the following features. For example, the first battery mounting part is coupled to the first transverse cross member and the first longitudinal cross member by a first fastening member passing through the first battery mounting part and the first overlapping portion.

In some implementations, one end of the first longitudinal cross member overlapping the first transverse cross member is coupled to the first transverse cross member through welding.

In some implementations, the first overlapping portion is disposed at an upper side of the first battery mounting part to face the floor panel.

In some implementations, the vehicle lower structure further includes a second transverse cross member mounted on the floor panel and disposed to be spaced apart from the first transverse cross member in a longitudinal direction; a second longitudinal cross member mounted on the floor panel and having one end coupled to the second transverse cross member through a reinforcement member; and a second battery mounting part coupled to a second overlapping portion in which the second transverse cross member and the reinforcement member overlap each other.

In some implementations, the reinforcement member has one end overlapped with and coupled to the second transverse cross member, and the other end overlapped with and coupled to the second longitudinal cross member.

In some implementations, the second battery mounting part is coupled to the second transverse cross member and the reinforcement member by a second fastening member passing through the second battery mounting part and the second overlapping portion.

In some implementations, the second overlapping portion is positioned below the second longitudinal cross member.

In some implementations, the second transverse cross member is disposed behind the first transverse cross member.

In some implementations, the second overlapping portion is disposed at an upper side of the second battery mounting part to face the floor panel.

According to another aspect, a vehicle lower structure for mounting a battery includes a floor panel, a first transverse cross member mounted on the floor panel, a first longitudinal cross member mounted on the floor panel and having one end coupled to the first transverse cross member through a reinforcement member, and a first battery mounting part coupled to a first overlapping portion in which the first transverse cross member and the reinforcement member overlap.

In some implementations, the vehicle lower structure can distribute the collision loads in various directions applied to the body through the battery.

For example, the vehicle lower structure can be configured to distribute all of the transverse load and the longitudinal load applied to the battery, thereby securing the robustness of the battery mounting structure, so that it is possible to secure the collision performance and durability performance of the vehicle.

The effects of the present disclosure are not limited to the above-described effects, and other effects of the present disclosure not mentioned will be clearly understood by those skilled in the art to which the present disclosure pertains from the following description.

It is understood that the term "vehicle" or other similar term as used herein is inclusive of motor-powered automobiles/vehicles in general such as passenger automobiles including sports utility vehicles, buses, trucks, various commercial automotives, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed below.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure.

In the figures, reference numbers refer to the same or equivalent sections of the present disclosure throughout the several figures of the drawing.

DETAILED DESCRIPTION

The specific structural or functional descriptions presented in the implementations of the disclosure are only illustrative for the purpose of describing the implementations according to the concept of the present disclosure, and the implementations according to the concept of the present disclosure may be carried out in various forms.

The present disclosure relates to a vehicle lower structure for mounting a battery, and provides a vehicle lower structure configured to distribute loads in various directions applied to a body through a battery.

Here, it should be noted that the battery may also be used in the same meaning as a "battery module" or "battery pack" that is normally mounted in electric vehicles unless otherwise specified.

Hereinafter, implementations of the present disclosure will be described with reference to the accompanying drawings. Matters expressed in the accompanying drawings may be different from the forms actually implemented in the drawings schematically for clearer explanation of the implementations of the present disclosure.

Figure 1:
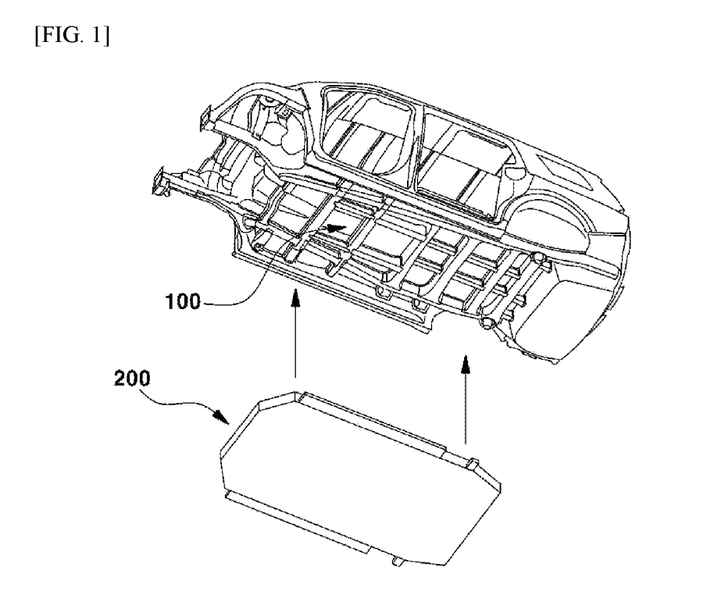
FIG. 1 is a view showing an example of a vehicle body including a body floor and a battery mounted on the body floor.
Figure 2:
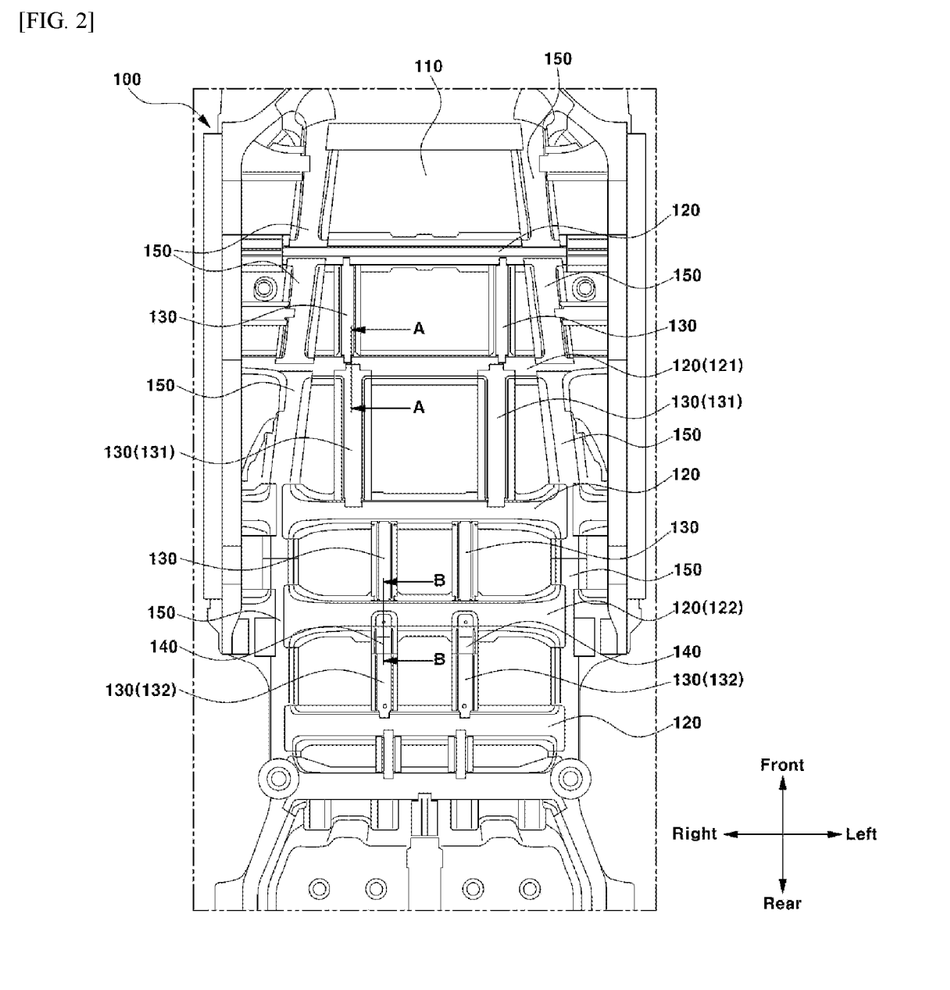
FIG. 2 is a view showing the body floor.
Figure 3:
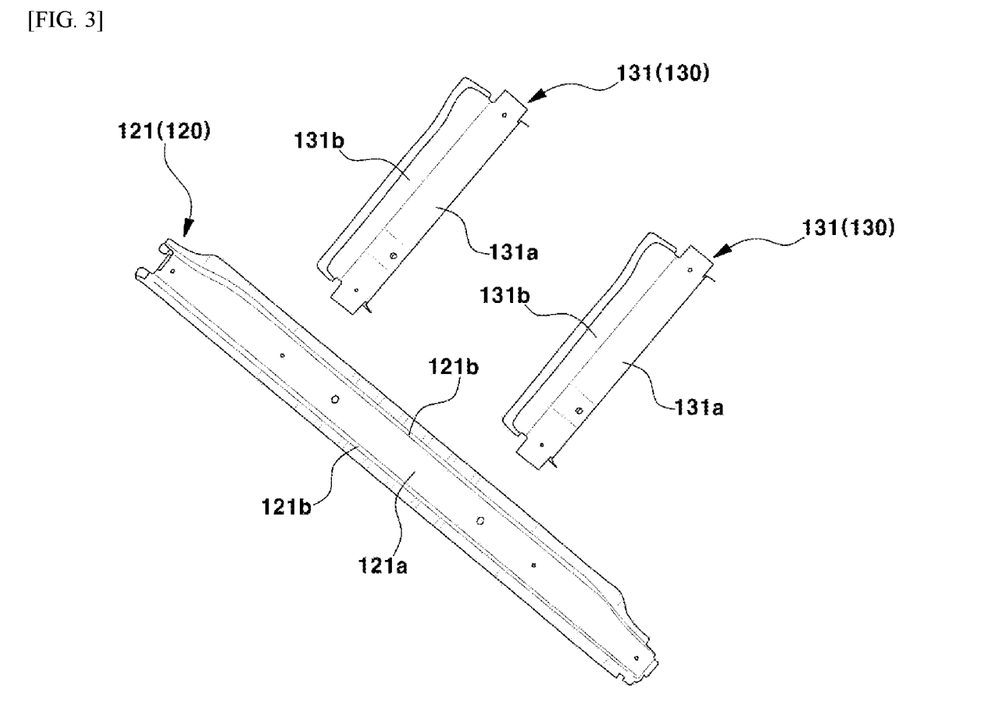
FIG. 3 is a view showing cross members included in the body floor.
Figure 4:
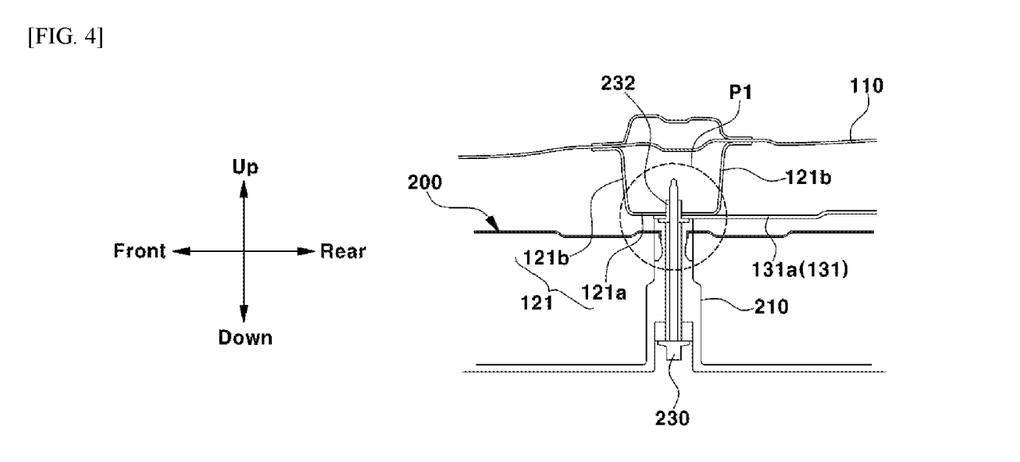
FIG. 4 is a cross-sectional view taken along line A-A in FIG. 2.
Figure 5:
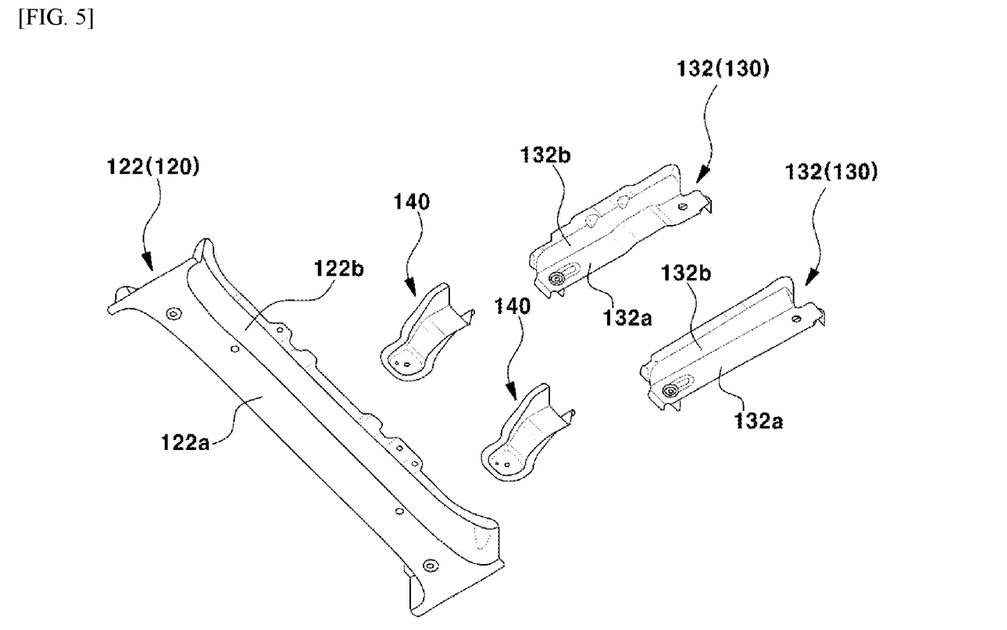
FIG. 5 is a view showing the cross members and reinforcement members included in the body floor.

FIG. 1 is a view showing a body to which a body floor is applied and a battery mounted on a body floor; FIG. 2 is a view showing the body floor; FIG. 3 is a view showing cross members included in the body floor; FIG. 4 is a cross-sectional view taken along line A-A in FIG. 2; FIG. 5 is a view showing the cross members and reinforcement members included in the body floor; and FIG. 6 is a cross-sectional view taken along line B-B in FIG. 2.

In some implementations, as shown in FIG. 1, a battery 200 used as a power source in a vehicle such as an electric vehicle is mounted on a body floor 100 and disposed under the body floor 100.

Figure 6:
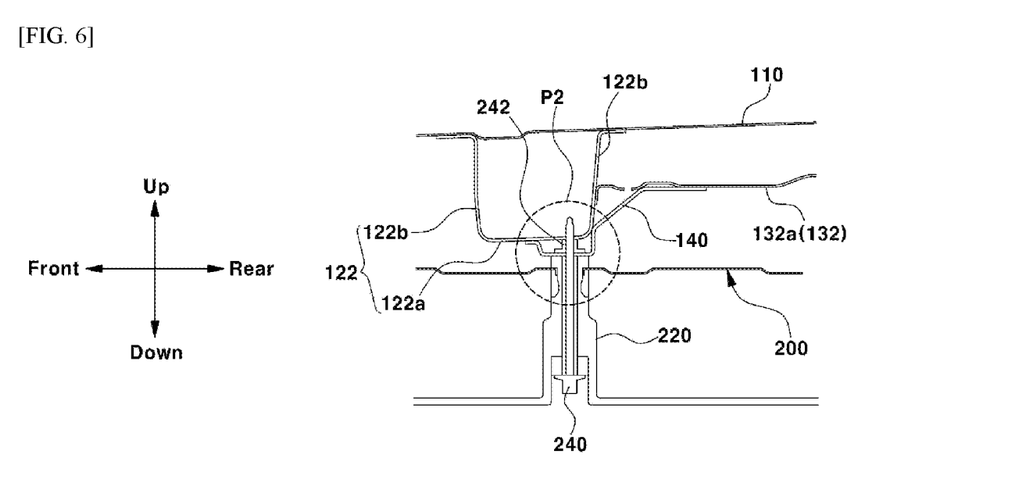
FIG. 6 is a cross-sectional view taken along line B-B in FIG. 2.

Referring to FIGS. 4 and 6, the battery 200 includes a plurality of battery mounting parts 210 and 220 coupled to the body floor 100. The battery mounting parts 210 and 220 are coupled to cross members 120 and 130 of the body floor 100 through fastening members 230 and 240. For example, a bolt or the like may be used as the fastening members 230 and 240. The fastening members 230 and 240 may be fastened to the cross members 120 and 130 or nut members 232 and 242 mounted on and fixed to a reinforcement member 140.

The vehicle lower structure for mounting the battery includes the body floor 100 as shown in FIG. 2.

The body floor 100 is configured to include a floor panel 110 and a plurality of transverse cross members 120 and a plurality of longitudinal cross members 130 mounted on the floor panel 110.

The floor panel 110 is formed in a plate structure extending in a horizontal direction and is disposed under a body to be disposed on a bottom surface of an interior space of the vehicle.

The transverse cross members 120 and the longitudinal cross members 130 are provided with a flange and may be fastened or bonded to the floor panel 110 through the flange. In addition, the transverse cross members 120 and the longitudinal cross members 130 may also be coupled with other components mounted on the floor panel 110. For example, the transverse cross members 120 may be coupled to overlap with side members 150 mounted on the floor panel 110.

The transverse cross members 120 are formed to extend in a transverse direction and are disposed to be spaced apart from each other in a longitudinal direction. The longitudinal cross members 130 are formed to extend in the longitudinal direction. The longitudinal cross members 130 include longitudinal cross members spaced apart in the longitudinal direction and longitudinal cross members spaced apart in the transverse direction.

A first longitudinal cross member 131 of the longitudinal cross members 130 is coupled to the first transverse cross member 121 of the transverse cross members 120 in a state of overlapping each other, and a second longitudinal cross member 132 of the longitudinal cross members 130 is coupled to a second transverse cross member 122 of the transverse cross members 120 through the reinforcement member 140.

In this specification, for clear understanding of the disclosure, the longitudinal cross member 130 coupled to any one of the transverse cross members 120 in a state of overlapping each other is referred to as the first longitudinal cross member 131, and the transverse cross member coupled to the first longitudinal cross member 131 in a state of overlapping each other is referred to as the first transverse cross member 121. In addition, the longitudinal cross member coupled to any one of the transverse cross members 120 through the reinforcement member 140 is referred to as the second longitudinal cross member 132, and the transverse cross member coupled to the second longitudinal cross member 132 through the reinforcement member 140 is referred to as the second transverse cross member 122.

The vehicle lower structure includes at least one of the first transverse cross member 121 and the second transverse cross member 122, and also includes at least one of the first longitudinal cross member 131 and the second longitudinal cross member 132. The vehicle lower structure includes the first longitudinal cross member 131 when including the first transverse cross member 121, and includes the second longitudinal cross member 132 when including the second transverse cross member 122.

In some implementations, the vehicle lower structure may include at least one first transverse cross member 121 and at least one first longitudinal cross member 131, and may also include at least one second transverse cross member 122 and at least one second longitudinal cross member 132.

In some implementations, as shown in FIG. 2, five transverse cross members 120 are arranged to be spaced apart from each other in the longitudinal direction on the floor panel 110, and the transverse cross member arranged in a second row among the five transverse cross members 120 is applied as the first transverse cross member 121. The first transverse cross member 121 is coupled to a pair of first longitudinal cross members 131 arranged to be spaced apart from each other in the transverse direction.

In some implementations, as shown in FIG. 2, four pairs of longitudinal cross members 130 are arranged to be spaced apart from each other in the longitudinal direction on the floor panel 110, and the pair of longitudinal cross members disposed at the rearmost among the four pair of longitudinal cross members 130 are applied as the second longitudinal cross members 132. The second longitudinal cross members 132 are connected to the second transverse cross members 122 through a pair of reinforcement members 140.

In some examples, the body floor 100 receives loads in various directions applied to the battery 200. The battery 200 includes a plurality of battery mounting parts 210 and 220 mounted on the body floor 100. The battery mounting parts 210 and 220 may be provided at an upper side of the battery 200.

A first battery mounting part 210 of the battery mounting parts 210 and 220 is simultaneously coupled to the first transverse cross member 121 and the first longitudinal cross member 131. In addition, the second battery mounting part 220 of the battery mounting parts 210 and 220 is simultaneously coupled to the second transverse cross member 122 and the second longitudinal cross member 132. The battery 200 may include at least one first battery mounting part 210 and at least one second battery mounting part 220.

As shown in FIGS. 2 to 4, one end of the first longitudinal cross member 131 is overlapped with and coupled to the first transverse cross member 121. One end of the first longitudinal cross member 131 is one end in the longitudinal direction. Specifically, one end of the first longitudinal cross member 131 is a front end of the first longitudinal cross member 131. A rear end of the first longitudinal cross member 131 is coupled to the transverse cross member disposed behind the first transverse cross member 121. The front end and rear end of the first longitudinal cross member 131 are coupled to different transverse cross members. The rear end of the first longitudinal cross member 131 may be coupled to the transverse cross member disposed behind the first transverse cross member 121 in a state of overlapping each other.

The front end of the first longitudinal cross member 131 is formed in a structure that may overlap the first transverse cross member 121. Specifically, the first longitudinal cross member 131 is configured to include a lower surface portion 131a facing the floor panel 110 and a pair of side surface portions 131b bent at both ends of the lower surface portion 131a to extend in an upward direction. The first longitudinal cross member 131 has a rectangular cross-sectional structure with an open upper surface portion. At this time, the lower surface portion 131a is formed to extend from a central portion to both ends of the first longitudinal cross member 131, and the side surface portion 131b is formed only on the central portion of the first longitudinal cross member 131.

The first transverse cross member 121 coupled to the first longitudinal cross member 131 also has a rectangular cross-sectional structure with an open upper surface portion. Accordingly, the first transverse cross member 121 is also configured to include a lower surface portion 121a facing the floor panel 110 and a pair of side surface portions 121b bent at both ends of the lower surface portion 121a to extend in an upward direction.

The lower surface portion 131a of the first longitudinal cross member 131 is coupled to the lower surface portion 121a of the first transverse cross member 121 in a state of overlapping each other. At this time, the lower surface portion 131a of the first longitudinal cross member 131 and the lower surface portion 121a of the first transverse cross member 121 may be coupled by welding. In other words, one end of the first longitudinal cross member 131 overlapping the first transverse cross member 121 may be coupled to the first transverse cross member 121 through welding.

Here, a portion where the first longitudinal cross member 131 and the first transverse cross member 121 overlap is referred to as a first overlapping portion P1. The first overlapping portion P1 is disposed above the first battery mounting part 210 to face the floor panel 110.

The first overlapping portion P1 is coupled to the first battery mounting part 210. The first battery mounting part 210 is coupled to the first overlapping portion P1 through the first fastening member 230. In other words, the first battery mounting part 210 is coupled to the first longitudinal cross member 131 and the first transverse cross member 121 through the first fastening member 230.

The first fastening member 230 passes through the first battery mounting part 210 and the first overlapping portion P1 and is fastened to a first nut member 232.

The first fastening member 230 may be a bolt member, and may vertically pass through the first battery mounting part 210 and the first overlapping portion P1. The first nut member 232 may be provided on the first overlapping portion P1. For example, the first nut member 232 may be assembled to the lower surface portions 121a and 131a in a state of passing through the lower surface portion 121a of the first transverse cross member 121 and the lower surface portion 131a of the first longitudinal cross member 131 at the same time and coupled to the lower surface portion 131a of the first longitudinal cross member 131 through welding or the like.

Referring to FIG. 2, the first transverse cross member 121 and the first longitudinal cross member 131 may be mounted and disposed at the central portion of the floor panel 110.

When a vehicle collision occurs, the impact is applied relatively more to the central portion of the floor panel 110 than to the rear portion of the floor panel 110. In addition, the first transverse cross member 121 and the first longitudinal cross member 131 are directly coupled in an overlapping structure, and thus are more advantageous in distributing the collision load than the second transverse cross member 122 and the second longitudinal cross member 132 coupled through the reinforcement member 140.

In some implementations, the first transverse cross member 121 and the first longitudinal cross member 131 can be arranged on the central portion of the floor panel 110 in the longitudinal direction.

In addition, referring to FIG. 2, the second transverse cross member 122 is disposed to be spaced apart from the first transverse cross member 121 in the longitudinal direction. The second transverse cross member 122 is disposed behind the first transverse cross member 121 at a predetermined interval.

One end of the second longitudinal cross member 132 is coupled with the second transverse cross member 122 through the reinforcement member 140. One end of the second longitudinal cross member 132 is one end in the longitudinal direction. Specifically, one end of the second longitudinal cross member 132 is a front end of the second longitudinal cross member 132. The other end of the second longitudinal cross member 132 is the rear end of the second longitudinal cross member 132. The rear end of the second longitudinal cross member 132 is coupled to the transverse cross member disposed behind the second transverse cross member 122. The front end and rear end of the second longitudinal cross member 132 are coupled to different transverse cross members. The rear end of the second longitudinal cross member 132 may be coupled to the transverse cross member disposed behind the second transverse cross member 122 in a state of overlapping each other.

Referring to FIGS. 5 and 6, the second transverse cross member 122 is configured to have a rectangular cross-sectional structure with an open upper surface portion. The second transverse cross member 122 is configured to include a lower surface portion 122a facing the floor panel 110 and a pair of rear side surface portions 122b bent at both ends of the lower surface portion 122a to extend in an upward direction.

The second longitudinal cross member 132 is also configured to have a rectangular cross-sectional structure with an open upper portion. The second longitudinal cross member 132 is also configured to include a lower surface portion 132a facing the floor panel 110 and a pair of side surface portions 132b bent at both ends of the lower surface portion 132a to extend in an upward direction. The reinforcement member 140 is formed to extend in the longitudinal direction. One end of the reinforcement member 140 is overlapped and coupled in a state of being stacked on the lower surface portion 122a of the second transverse cross member 122. The other end of the reinforcement member 140 is overlapped and coupled in a state of being stacked on the lower surface portion 132a of the second longitudinal cross member 132.

One end of the reinforcement member 140 is one end in the longitudinal direction. Specifically, one end of the reinforcement member 140 is the front end of the reinforcement member 140, and the other end of the reinforcement member 140 is the rear end of the reinforcement member 140. The central portion of the reinforcement member 140 is integrally formed between the front end and rear end of the reinforcement member 140 and is formed to be inclined in the upward direction.

Here, the overlapping portion of the second transverse cross member 122 and the reinforcement member 140 is referred to as a second overlapping portion P2. Specifically, the second overlapping portion P2 may refer to the lower surface portion 122a of the second transverse cross member 122 and the front end of the reinforcement member 140 overlapping the lower surface portion 122a. The second overlapping portion P2 is disposed above the second battery mounting part 220 to face the floor panel 110.

The front end of the reinforcement member 140 is formed to overlap the second transverse cross member 122, and the rear end of the reinforcement member 140 is formed to overlap the second longitudinal cross member 132.

A flange provided at the front end of the reinforcement member 140 may be coupled to the lower surface portion 122a of the second transverse cross member 122 through welding. The rear end of the reinforcement member 140 may be coupled to the front end of the second longitudinal cross member 132 through welding.

Further, the front end of the second longitudinal cross member 132 is coupled to the rear side surface portion 122b of the second transverse cross member 122 by welding. The front end of the second longitudinal cross member 132 may be provided with a flange bonded to the rear side surface portion 122b of the second transverse cross member 122 through welding.

The second overlapping portion P2 is coupled to the second battery mounting part 220. The second battery mounting part 220 is coupled to the second overlapping portion P2 by a second fastening member 240. In other words, the second battery mounting part 220 is coupled to the second transverse cross member 122 and the reinforcement member 140 through the second fastening member 240. Specifically, the second battery mounting part 220 is simultaneously coupled to the lower surface portion 122a of the second transverse cross member 122 and the front end of the reinforcement member 140 through the second fastening member 240.

At this time, the second fastening member 240 passes through the second battery mounting part 220 and the second overlapping portion P2 and is fastened to a second nut member 242. The second fastening member 240 may be a bolt member, and may pass through the second battery mounting part 220 and the second overlapping portion P2 in a vertical direction. The second nut member 242 is provided on the second overlapping portion P2. For example, the second nut member 242 may be stacked on the lower surface portion 122a of the second transverse cross member 122 in a state of being coupled to the front end of the reinforcement member 140. In other words, the second nut member 242 may be disposed and fixed between the front end of the reinforcement member 140 and the lower surface portion 122a of the second transverse cross member 122.

As shown in FIG. 6, the front end of the reinforcement member 140 may be configured to have a rectangular cross-sectional structure with an open upper surface portion in order to accommodate the second nut member 242. The front end of the reinforcement member 140 is coupled to the lower surface portion 122a of the second transverse cross member 122 through welding, and is also coupled to the lower surface portion 122a of the second transverse cross member 122 by the second fastening member 240.

In addition, the reinforcement member 140 has a central portion formed to be inclined in the upward direction and may be coupled to both the second transverse cross member 122 and the second longitudinal cross member 132 having a vertical height different from that of the second transverse cross member 122. The lower surface portion 132a of the second longitudinal cross member 132 is disposed above the lower surface portion 122a of the second transverse cross member 122.

The second transverse cross member 122 and the second longitudinal cross member 132 have a height difference, but are coupled through the reinforcement member 140, and thus may be simultaneously coupled with the second battery mounting part 220. As shown in FIG. 6, the second overlapping portion P2, which is a portion where the second transverse cross member 122 and the reinforcement member 140 overlap each other, is positioned below the second longitudinal cross member 132.

Referring to FIG. 2, the second transverse cross member 122, the second longitudinal cross member 132, and the reinforcement member 140 are disposed at the rear portion of the floor panel 110.

In addition, the vehicle lower structure configured as described above has a T-shaped structure or an I-shaped structure or a #-shaped structure depending on the coupling structure between the cross members 120 and 130 or the coupling structure between the cross members 120 and 130 and the reinforcement member 140.

While the implementations of the present disclosure have been described in detail above, the terms or words used in this specification and claims should not be construed as being limited to general or dictionary meanings, the scope of the present disclosure is not limited to the above-described implementations, and various modifications and improvements by those skilled in the art using the basic concept of the present disclosure as defined in the appended claims are also included in the scope of the present disclosure.

What is claimed is:

1. A vehicle structure for mounting a battery, comprising:
a floor panel;
a first transverse cross member disposed at the floor panel;
a first longitudinal cross member disposed at the floor panel, the first longitudinal cross member having a first end that overlaps with and is coupled to the first transverse cross member to thereby define a first overlapping portion in which the first transverse cross member and the first longitudinal cross member overlap with each other; and
a first battery mounting part coupled to the first overlapping portion.

2. The vehicle structure of claim 1, further comprising a first fastening member that couples the first battery mounting part to the first transverse cross member and the first longitudinal cross member, the first fastening member passing through the first battery mounting part and the first overlapping portion.

3. The vehicle structure of claim 1, wherein the first end of the first longitudinal cross member is coupled to the first transverse cross member by welding.

4. The vehicle structure of claim 1, wherein the first overlapping portion is defined at an upper side of the first battery mounting part and faces the floor panel.

5. The vehicle structure of claim 1, further comprising:
a second transverse cross member disposed at the floor panel and spaced apart from the first transverse cross member in a longitudinal direction of the floor panel;
a second longitudinal cross member disposed at the floor panel, the second longitudinal cross member having a second end that is coupled to the second transverse cross member;
a reinforcement member that couples the second transverse cross member and the second longitudinal cross member to each other and defines a second overlapping portion in which the second transverse cross member and the reinforcement member overlap with each other; and
a second battery mounting part coupled to the second overlapping portion.

6. The vehicle structure of claim 5, wherein the reinforcement member has (i) a first overlapping end that overlaps with and is coupled to the second transverse cross member and (ii) a second overlapping end that overlaps with and is coupled to the second longitudinal cross member.

7. The vehicle structure of claim 5, further comprising a second fastening member that couples the second battery mounting part to the second transverse cross member and the reinforcement member, the second fastening member passing through the second battery mounting part and the second overlapping portion.

8. The vehicle structure of claim 5, wherein the second overlapping portion is defined at a position below the second longitudinal cross member.

9. The vehicle structure of claim 5, wherein the second transverse cross member is disposed rearward relative to the first transverse cross member in the longitudinal direction.

10. The vehicle structure of claim 5, wherein the second overlapping portion is disposed at an upper side of the second battery mounting part and faces the floor panel.

11. A vehicle structure for mounting a battery, comprising:
a floor panel;
a first transverse cross member disposed at the floor panel;
a first longitudinal cross member disposed at the floor panel, the first longitudinal cross member having a first end coupled to the first transverse cross member;
a reinforcement member that couples the first transverse cross member and the first longitudinal cross member to each other and defines a first overlapping portion in which the first transverse cross member and the reinforcement member overlap with each other; and
a first battery mounting part coupled to the first overlapping portion.

12. The vehicle structure of claim 11, wherein the reinforcement member has (i) a first overlapping end that overlaps with and is coupled to the first transverse cross member and (ii) a second overlapping end that overlaps with and is coupled to the first longitudinal cross member.

13. The vehicle structure of claim 11, further comprising a first fastening member that couples the first battery mounting part to the first transverse cross member and the reinforcement member, the first fastening member passing through the first battery mounting part and the first overlapping portion.

14. The vehicle structure of claim 11, wherein the first overlapping portion is defined at a position below the first longitudinal cross member.

15. The vehicle structure of claim 11, wherein the first overlapping portion is defined at an upper side of the first battery mounting part and faces the floor panel.

16. The vehicle structure of claim 11, further comprising:
a second transverse cross member disposed at the floor panel and spaced apart from the first transverse cross member in a longitudinal direction of the floor panel;
a second longitudinal cross member disposed at the floor panel, the second longitudinal cross member having a second end that overlaps with and is coupled to the second transverse cross member to thereby define a second overlapping portion in which the second transverse cross member and the second longitudinal cross member overlap with each other; and
a second battery mounting part coupled to the second overlapping portion.

17. The vehicle structure of claim 16, further comprising a second fastening member that couples the second battery mounting part to the second transverse cross member and the second longitudinal cross member, the second fastening member passing through the second battery mounting part and the second overlapping portion.

18. The vehicle structure of claim 16, wherein the second end of the second longitudinal cross member is coupled to the second transverse cross member by welding.

19. The vehicle structure of claim 16, wherein the second overlapping portion is defined at an upper side of the second battery mounting part to faces the floor panel.

20. The vehicle structure of claim 16, wherein the first transverse cross member is disposed rearward relative to the second transverse cross member.

* * * * *